US010075306B2

(12) United States Patent
Wang et al.

(10) Patent No.: US 10,075,306 B2
(45) Date of Patent: Sep. 11, 2018

(54) ECHO DETECTION CIRCUIT AND METHOD FOR MULTI-CARRIER SYSTEM

(71) Applicant: MStar Semiconductor, Inc., Hsinchu Hsien (TW)

(72) Inventors: Kun-Yu Wang, Hsinchu Hsien (TW); Ko-Yin Lai, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/435,592

(22) Filed: Feb. 17, 2017

(65) Prior Publication Data

US 2018/0097662 A1 Apr. 5, 2018

(30) Foreign Application Priority Data

Oct. 5, 2016 (TW) .............................. 105132157 A

(51) Int. Cl.
*H04L 27/26* (2006.01)
*H04L 25/02* (2006.01)

(52) U.S. Cl.
CPC ...... *H04L 25/0216* (2013.01); *H04L 25/0232* (2013.01); *H04L 27/2628* (2013.01)

(58) Field of Classification Search
CPC . H04L 27/2695; H04L 27/2601; H04L 27/26; G01S 5/0273
See application file for complete search history.

(56) References Cited

U.S. PATENT DOCUMENTS 7,292,621 B2 * 11/2007 Braam ................. H04B 1/7115
375/148
2008/0112475 A1 * 5/2008 Ma ...................... H04L 25/0212
375/224

* cited by examiner

*Primary Examiner* — David S Huang
(74) *Attorney, Agent, or Firm* — Edell, Shapiro & Finnan, LLC

(57) ABSTRACT

An echo detection circuit for a multi-carrier system includes a memory, a threshold generating circuit and an echo determining circuit. The memory stores a plurality of channel impulse response values of the multi-channel system. The channel impulse response values include a target channel impulse response value, a plurality of preceding channel impulse response values and a plurality of subsequent channel impulse response values; a threshold generating circuit, coupled to the memory, generating a threshold corresponding to the target channel impulse response according to the preceding channel impulse response values and the subsequent channel impulse response values; and an echo determining circuit, coupled to the threshold generating circuit and the memory, comparing the target channel impulse response value with the threshold to determine whether the target channel impulse response value corresponds to an echo path of the multi-carrier system.

18 Claims, 11 Drawing Sheets

ECHO DETECTION CIRCUIT AND METHOD FOR MULTI-CARRIER SYSTEM

This application claims the benefit of Taiwan application Serial No. 105132157, filed Oct. 5, 2016, the subject matter of which is incorporated herein by reference.

BACKGROUND OF THE INVENTION

Field of the Invention

The invention relates in general to an echo detection circuit and method, and more particularly to an echo detection circuit and method for a multi-carrier system.

Description of the Related Art

Echo is a common issue that a multi-carrier system frequently encounters. To increase the accuracy of data decoding, the position and channel length of echo need to be correctly estimated. In a conventional approach, the size of a channel impulse response (CIR) is compared with a constant threshold, and the position of the channel impulse response is deemed a position of echo when the size of the channel impulse response is greater than the threshold. However, the constant threshold likely incurs misjudgment. For example, a high threshold may cause smaller echo in a channel impulse response that is then neglected, and a low threshold may cause noise to be misjudged as echo in a channel impulse response to result in an increased data error rate at a receiver. Further, if an average of channel impulse response values corresponding to multiple channel impulse indices in a predetermined range including a channel impulse response index is used as a threshold, the predetermined channel impulse response value may also be too large, such that the threshold in the predetermined range may be too high and cause the foregoing issue of misjudgment.

SUMMARY OF THE INVENTION

The invention is directed to an echo detection circuit and method for a multi-carrier system to accurate detect echo and enhance circuit performance.

The present invention discloses an echo detection circuit for a multi-carrier system. The echo detection circuit include: memory, storing a plurality of channel impulse response values of the multi-carrier system, the channel impulse response values including a target channel impulse response value, a plurality of preceding channel impulse response values and a plurality of subsequent channel impulse response values; a threshold generating circuit, coupled to the memory, generating a threshold corresponding to the target channel impulse response value according to the preceding channel impulse response values and the subsequent channel impulse response values; and an echo determining circuit, coupled to the threshold generating circuit and the memory, comparing the target channel impulse response value with the threshold to determine whether the target channel impulse response value corresponds to an echo path of the multi-carrier system.

The present invention further discloses an echo detection method for a multi-carrier system. The echo detection method includes: storing a plurality of channel impulse response values of the multi-carrier system, the channel impulse response values including a target channel impulse response value, a plurality of preceding channel impulse response values and a plurality of subsequent channel impulse response values; generating a threshold corresponding to the target channel impulse response value according to the preceding channel impulse response values and the subsequent channel impulse response values; and comparing the target channel impulse response value with the threshold to determine whether the target channel impulse response value corresponds to an echo path of the multi-carrier system.

The echo detection circuit and method for a multi-carrier system of the present invention are capable of adaptively adjusting the threshold according to current channel impulse response values. As opposed to the prior art, the echo detection circuit and method for a multi-carrier system of the present invention are more flexible and are capable of more accurately determining echo.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure of the application includes an echo detection circuit for a multi-carrier system and a method thereof. In possible implementation, one person skilled in the art can choose equivalent elements or steps to realize the present invention; that is, the implementation of the present invention is not limited to the non-limiting embodiments below.

The present invention may be applied to various types of multi-carrier systems, e.g., an orthogonal frequency-division multiplexing (OFDM) multi-carrier system. For example, an OFDM multi-carrier system may be a Digital Video Broadcasting-Terrestrial (DVB-T) television system, such as a television system based on DVB-T2, DVB-C2, DTMB and ISDBT specifications. To solve the issues caused by a constant threshold of the prior art, when determining whether a predetermined channel impulse response is echo, the present invention further refers to the predetermined channel impulse response as well as multiple preceding and subsequent channel impulse responses to dynamically determine the threshold, and thus effectively prevents the issues of a constant threshold.

Figure 1:
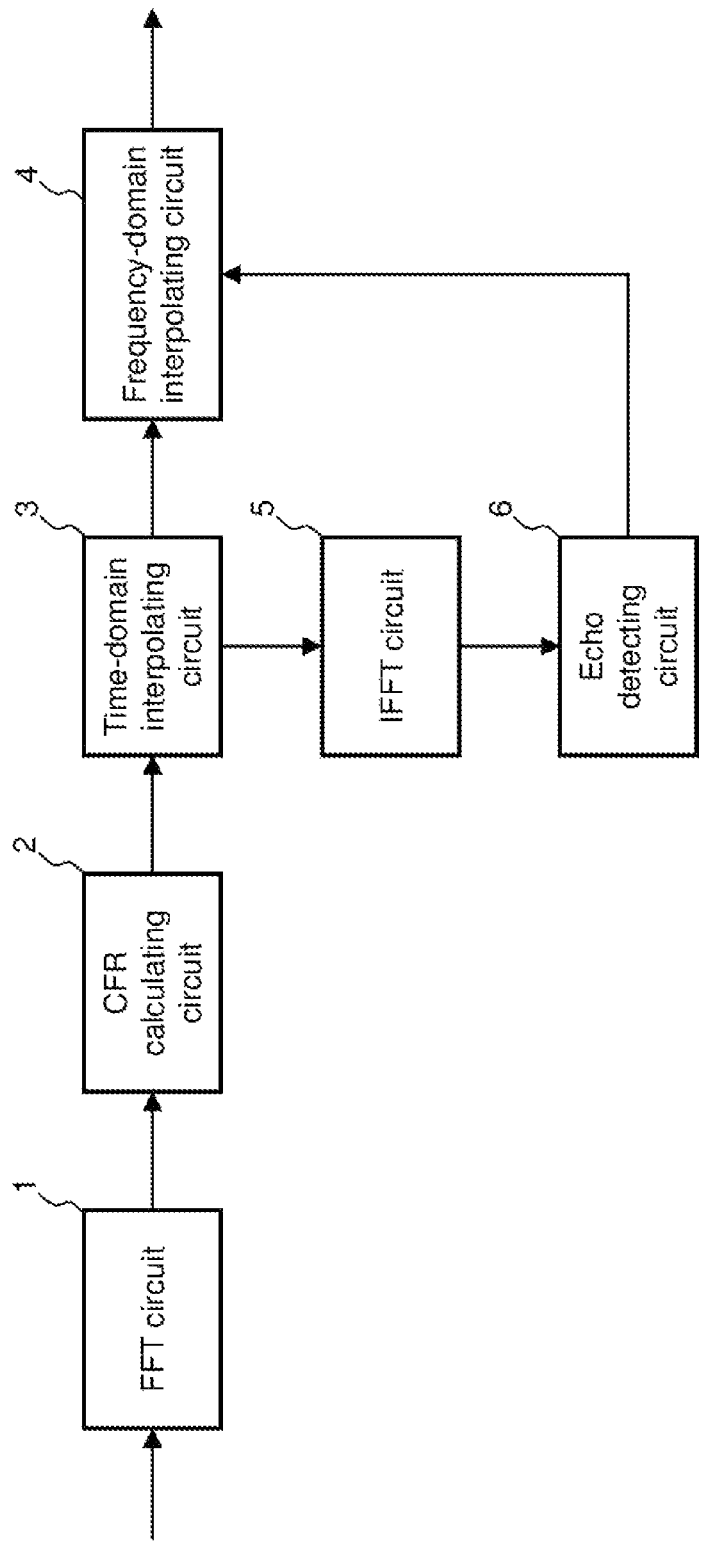
FIG. 1 is a partial block diagram of a multi-carrier system of the present invention.

FIG. 1 shows a partial block diagram of a multi-carrier system of the present invention. A fast Fourier transform (FFT) circuit 1 transforms an input signal to the frequency domain. A channel frequency response (CFR) calculating circuit 2 calculates a channel frequency response of a predetermined pilot signal (e.g., a scattered pilot) in the frequency domain. A time-domain interpolating circuit 3 performs interpolation in the time domain according to channel frequency responses of pilot signals to obtain channel frequency responses of multiple OFDM signals among the pilot signals. A frequency-domain interpolating circuit 4 performs interpolation in the frequency domain according to the channel frequency responses of the pilot signals to obtain channel frequency responses of multiple sub-carriers among the pilot signals. To operate, the frequency-domain interpolating circuit 4 needs to learn the channel length and an echo position of the multi-carrier system. An inverse fast Fourier transform (IFFT) circuit 5 transforms the channel frequency response to a channel impulse response (CIR). An echo detection circuit 6 obtains the foregoing channel length and echo position by detecting the channel impulse response in the time domain.

Figure 2:
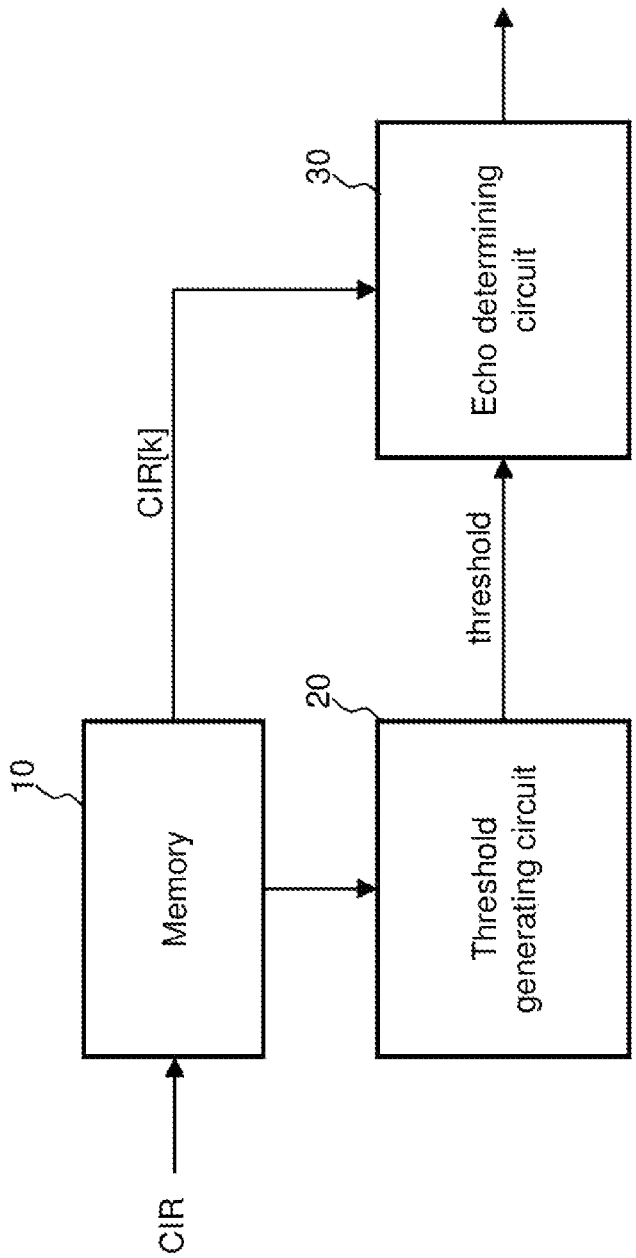
FIG. 2 is a block diagram of an echo detection circuit for a multi-carrier system according to an embodiment of the present invention.
Figure 3:
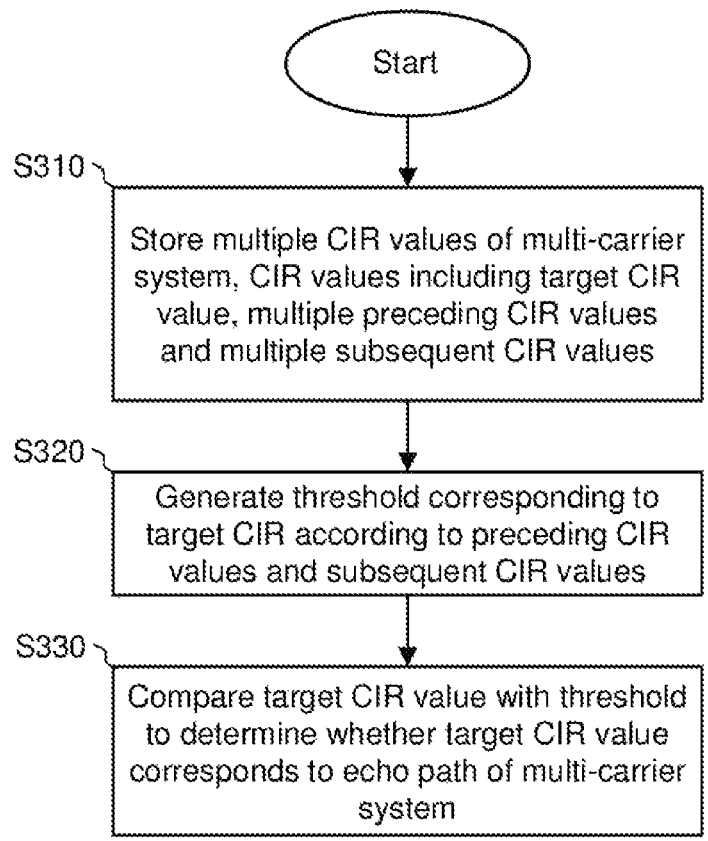
FIG. 3 is a flowchart of an echo detection method for a multi-carrier system corresponding to FIG. 2 according to an embodiment of the present invention.

FIG. 2 shows a block diagram of the echo detection circuit 6 for a multi-carrier system according to an embodiment of the present invention. FIG. 3 shows a flowchart of an echo detection method for a multi-carrier system corresponding to FIG. 2 according to an embodiment of the present invention. The echo detection circuit 6 according to the embodiment of the present invention includes a memory 10, a threshold generating circuit 20 and an echo determining circuit 30. The memory 10 (e.g. a register) stores a plurality of channel impulse response values CIR of the multi-carrier system. These channel impulse response values include a target channel impulse response value CIR[k], a plurality of preceding channel impulse response values before the target channel impulse response value and a plurality of subsequent channel impulse response values after the target channel impulse response value (step S310). Due to the periodic property of an IFFT index, the size of the memory 10 may be designed to sufficiently store a size N of an IFFT window (assuming that N is a positive integer, and $0 \leq k \leq N-1$), for example. The threshold generating circuit 20 generates a threshold according to channel impulse response values. More specifically, the threshold generating circuit 20 generates a threshold corresponding to the target channel impulse response value CIR[k] according to the preceding channel impulse response values and the subsequent channel impulse response values (step S320). The echo determining circuit 30 compares the target channel impulse response value CIR[k] with the threshold to determine whether the target channel impulse response value CIR[k] corresponds to an echo path of the multi-carrier system (step S330).

Figure 4:
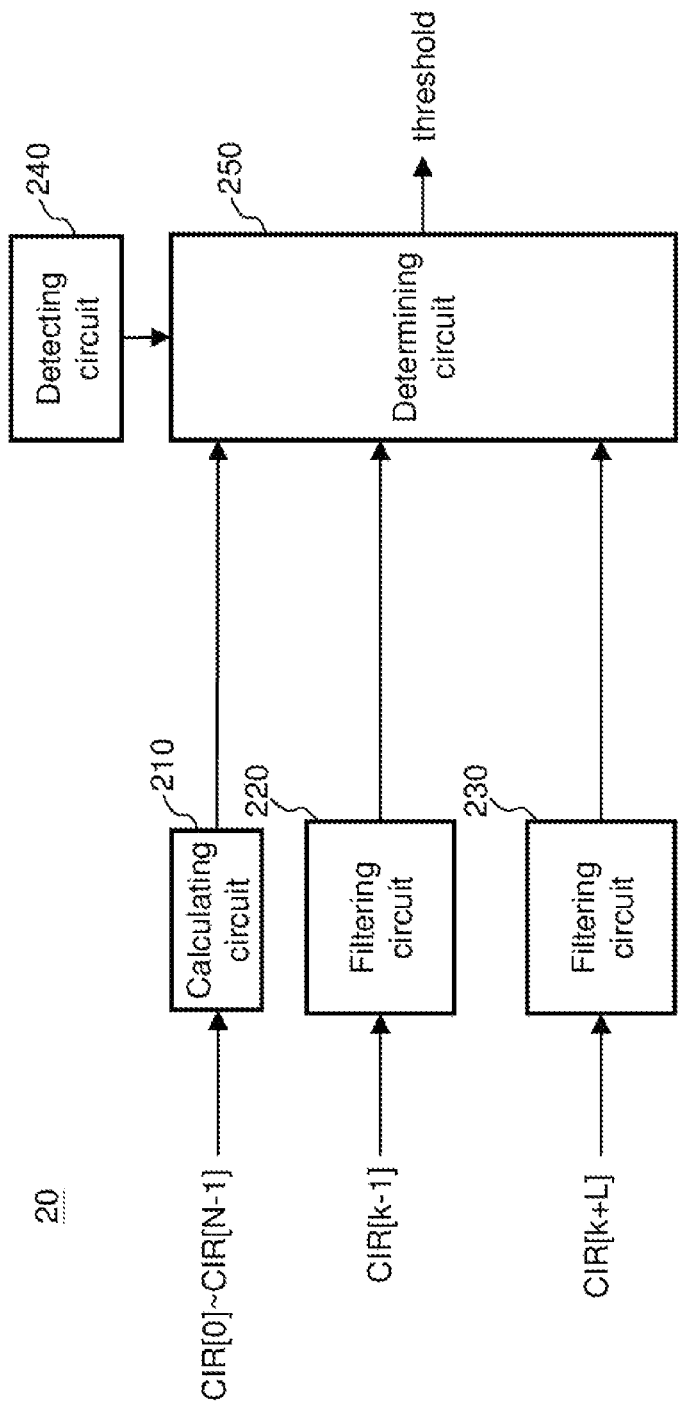
FIG. 4 is a block diagram of a threshold generating circuit according to an embodiment of the present invention.
Figure 5:
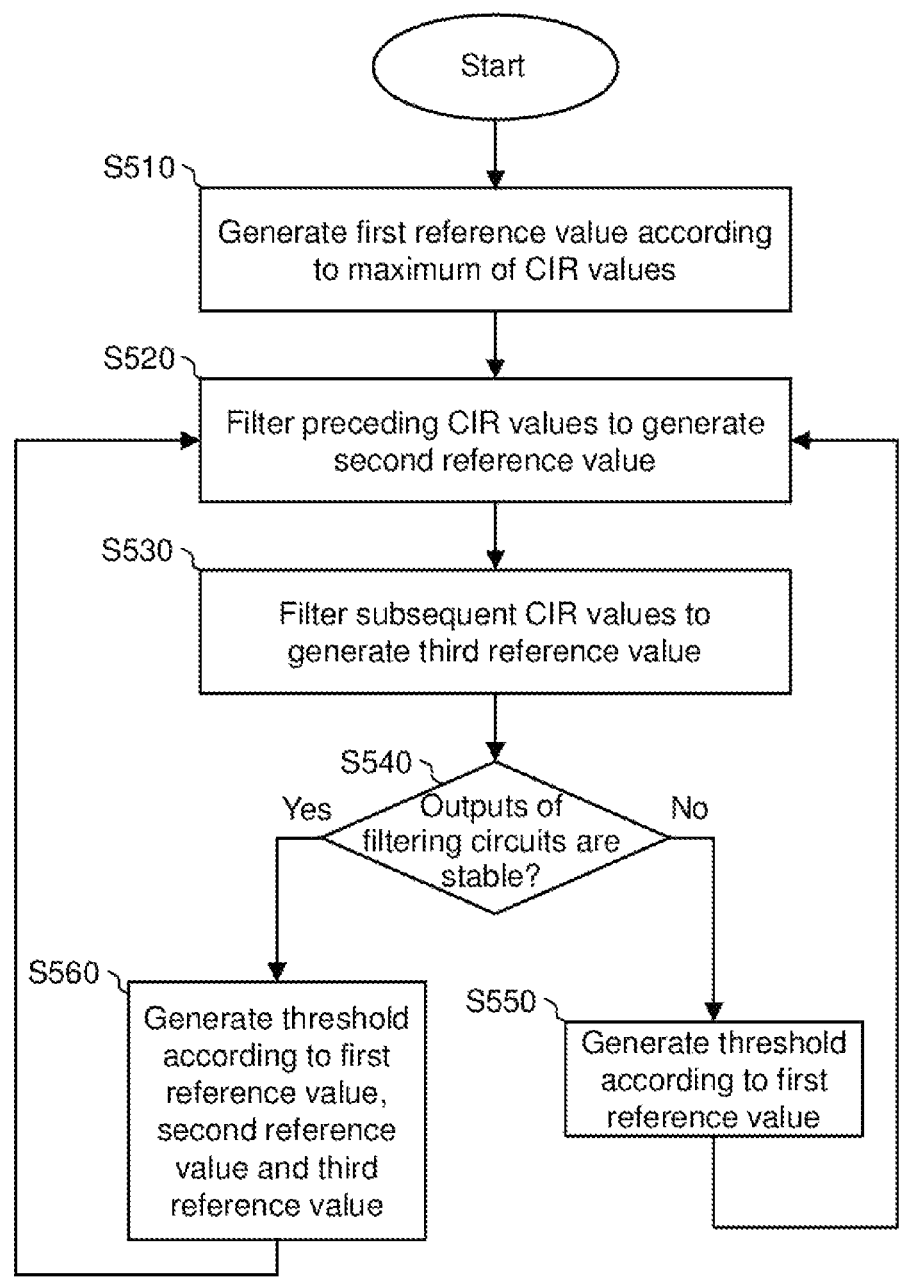
FIG. 5 is a detailed process of step S320 in an echo detection method for a multi-carrier system according to an embodiment of the present invention.

FIG. 4 shows a block diagram of the threshold generating circuit 20 according to an embodiment of the present invention. FIG. 5 shows a detailed process of step S320 in the echo detection method for a multi-carrier system according to an embodiment of the present invention. The threshold generating circuit 20 includes a calculating circuit 210, a filtering circuit 220, a filtering circuit 230, a detecting circuit 240 and a determining circuit 250. One main purpose of the threshold generating circuit 20 is generating a threshold that is associated with the target channel impulse response value CIR[k], and such object may be achieved though filtering L preceding channel impulse response values of the target channel impulse response value CIR[k] by the filtering circuit 220 and filtering L subsequent channel impulse response values of the target channel impulse response value CIR[k] by the filtering circuit 230, where L is the size of filtering windows of the filtering circuits 220 and 230.

Figure 6:
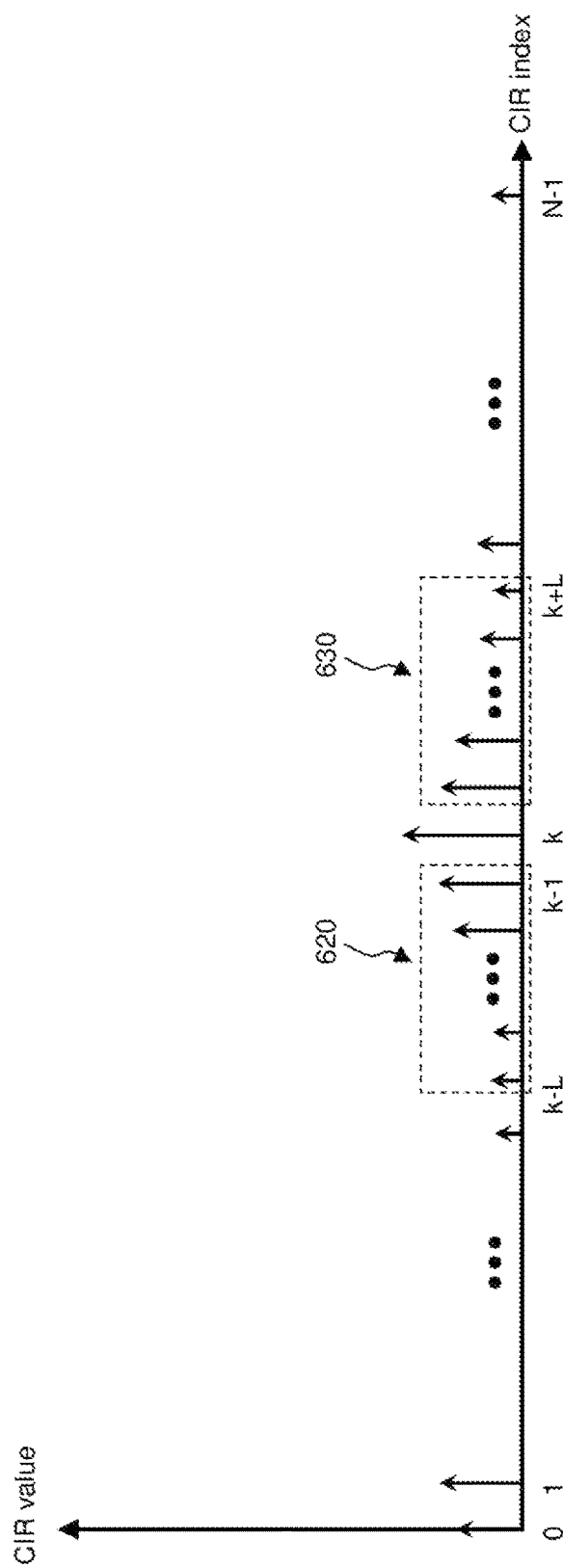
FIG. 6 is a schematic diagram of a relationship between a channel impulse response value and a channel impulse response index.

In one embodiment, the calculating circuit 210 generates a first reference value according to a maximum value of the N channel impulse response values CIR (step S510). For example, the first reference value is equal to R times of the maximum channel impulse response value ($0<R<1$). The filtering circuits 220 and 230 may be moving average calculating circuits, each including a buffer unit capable of storing at least (L−1) channel impulse response values. FIG. 6 shows a schematic diagram of a relationship between a channel impulse response value and a channel impulse response index. The filtering circuit 220 filters the L preceding channel impulse response values (located in a filtering window 620) before the target channel impulse response value CIR[k], and the filtering circuit 230 filters the L subsequent channel impulse response values (located in a filtering window 630) after the target channel impulse response value CIR[k]. Assuming the filtering function is realized by moving average calculating circuits, when the echo determining circuit 30 is to compare the target channel impulse response value CIR[k] with the threshold, inputs of the filtering circuits 220 and 230 are respectively $(k-1)^{th}$ and $(k+L)^{th}$ channel impulse response values. Further, the filtering circuits 220 and 230 generate a second reference value and a third reference value according to an average of a sum of the L channel impulse response values, respectively (steps S520 and S530).

The detecting circuit 240 determines whether outputs of the filtering circuit 220 and the filtering circuit 230 are stable according to whether a counter value (generated by a counter (not shown)) is greater than or equal to a predetermined value. More specifically, when the index k of the target channel impulse response value CIR[k] is smaller than L, the respective buffer units in the filtering circuit 220 and the filtering circuit 230 are not yet filled with channel impulse response values, and the second and third references values cannot reflect conditions of the multi-carrier system at this point. Thus, if the determining circuit 250 determines the threshold according to such second and third reference values, an inadequately small threshold may be obtained in a way that system misjudgment may be caused.

Therefore, before the counter value reaches the predetermined value, the detecting circuit 240 determines that the outputs of the filtering circuit 220 and the filtering circuit 230 are not yet stable (the determination result of step S540 is negative, and the detecting circuit 240 does not generate an indication signal), and the determining circuit 250 generates the threshold according to the first reference value (step S550), e.g., directly using the first reference value as the threshold. When the index k of the target channel impulse response value is equal to L, at this point, the second reference value is a result of a filtering calculation that the filtering circuit 220 performs on the L channel impulse response values corresponding to channel impulse response indices 0 to (k−1), and the third reference value is a result of a filtering calculation that the filtering circuit 230 performs on the L channel impulse response values corresponding to channel impulse response indices (k+1) to (k+L). At this point, the detecting circuit 240 determines that the outputs of the filtering circuit 220 and the filtering circuit 230 are stable (the determination result of step S540 is affirmative, and the detecting circuit 240 generates the indication signal). Thus, the detecting circuit 250 generates the threshold according to the indication signal, and the first, second and third reference signals (step S560). For example, the determining circuit 250 obtains a minimum value from the first reference value, $\alpha$ times the second reference value and $\beta$ times the third reference value as the threshold ($\alpha$, $\beta$>1, where $\alpha$ and $\beta$ may be equal or different).

Figure 7:
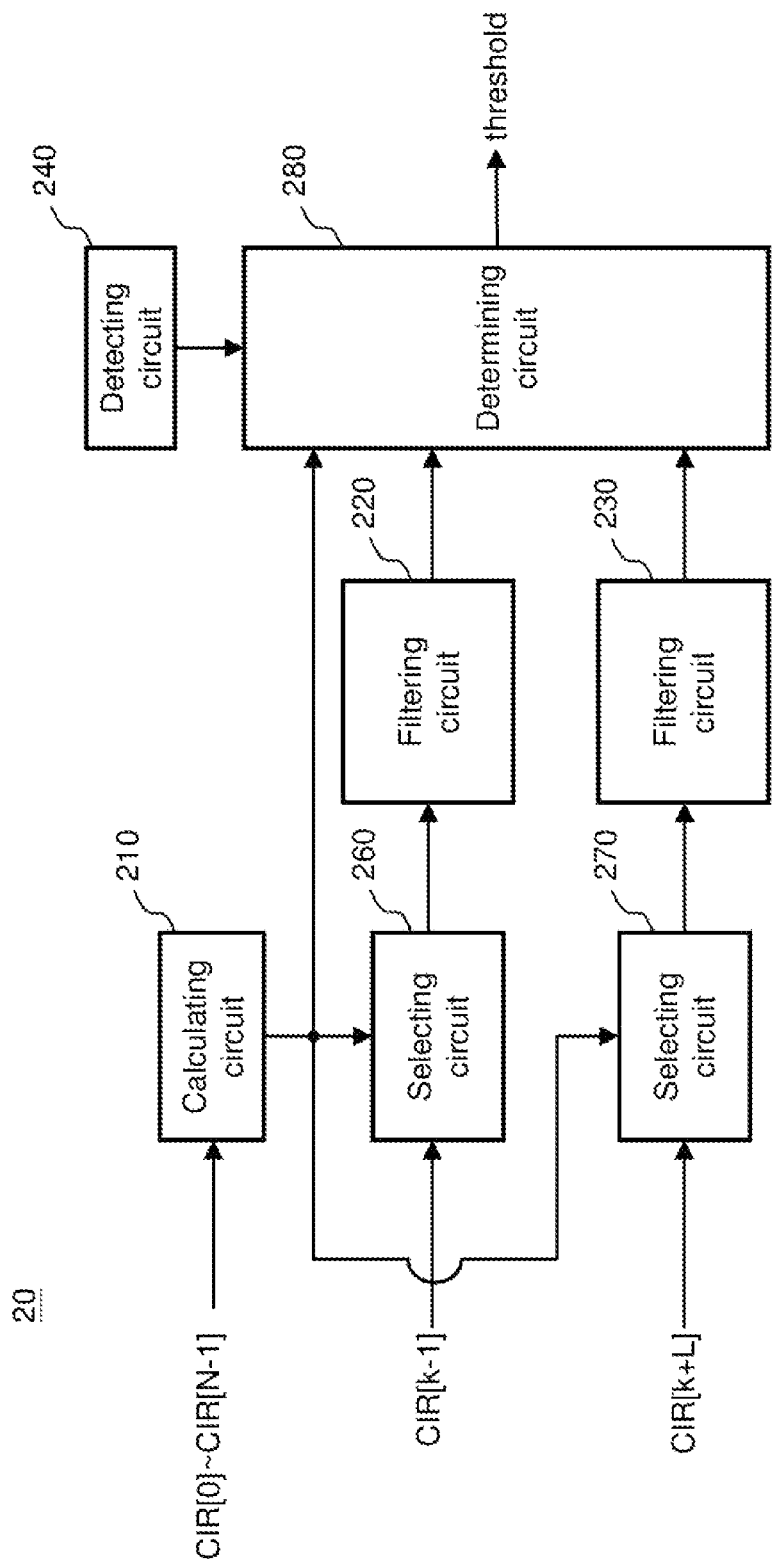
FIG. 7 is a block diagram of a threshold generating circuit according to another embodiment of the present invention.
Figure 8:
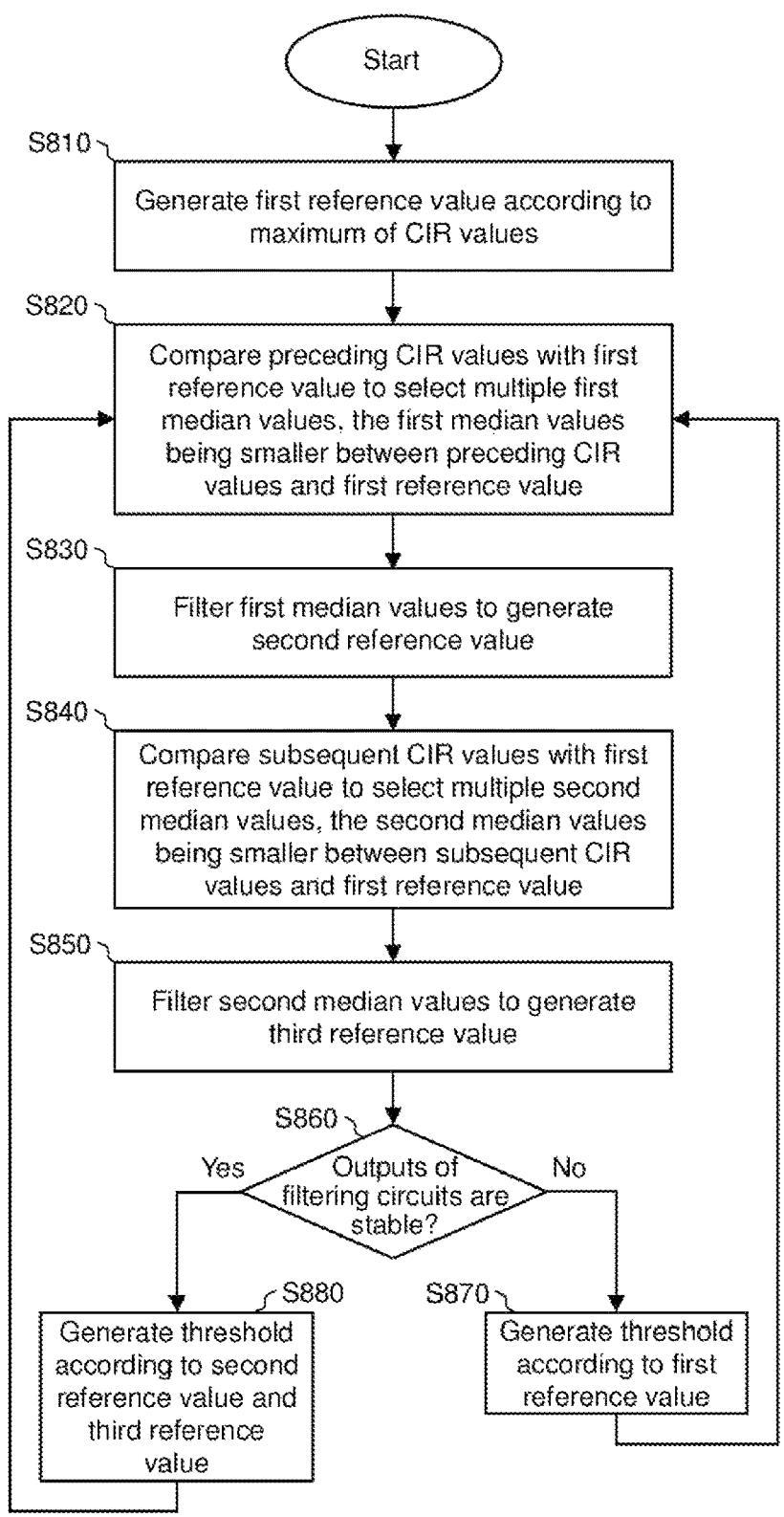
FIG. 8 is a detailed process of step S320 in an echo detection method for a multi-carrier system according to another embodiment of the present invention.

FIG. 7 shows a block diagram of the threshold generating circuit 20 according to another embodiment of the present invention. FIG. 8 shows a detailed process of step S320 in the echo detection method for a multi-carrier system according to another embodiment of the present invention. The threshold generating circuit 20 includes a calculating circuit 210, a filtering circuit 220, a filtering circuit 230, a detecting circuit 240, a selecting circuit 260, a selecting circuit 270 and a determining circuit 280. Circuits with the same denotations as those in the embodiment in FIG. 4 have identical functions, and associated details shall be omitted herein. One difference of the embodiment from the embodiment in FIG. 4 is that, in this embodiment, the filtering circuit 220 and the filtering circuit 230 respectively filter outputs from the selecting circuits 260 and the selecting circuit 270 instead of directly filtering the channel impulse response value CIR. More specifically, after the calculating circuit 210 generates the first reference value (step S810), the selecting circuit 260 individually compares the preceding L channel impulse response values CIR[k–1] to CIR[k–L] of the target channel impulse response value CIR[k] with the first reference value, and outputs L first median values, which are respectively the smaller between the L channel impulse response values CIR[k–1] to CIR[k–L] and the first reference value (step S820). The filtering circuit 220 then filters the first median values to generate a second reference value (step S830). Similarly, the selecting circuit 270 individually compares the subsequent channel impulse response values CIR[k+1] to CIR[k+L] of the target channel impulse response value CIR[k] with the first reference value, and outputs L second median values, which are respectively the smaller between the L channel impulse response values CIR[k+1] to CIR[k+L] and the first reference value (step S840). The filtering circuit 230 then filters the second median values to generate a third reference value (step S850).

Before the counter value reaches the predetermined value, the detecting circuit 240 determines that the outputs of the filtering circuit 220 and the filtering circuit 230 are not yet stable (the determination result of step S860 is negative, and the detecting circuit 240 does not generate an indication signal). Thus, the determining circuit 280 generates a threshold according to the first threshold (step S870), and steps S820 to S870 are iterated until the counter value is greater than or equal to the predetermined value. At this point, the detecting circuit 240 determines that the outputs of the filtering circuit 220 and the filtering circuit 230 are stable (the determination result of step S860 is affirmative, and the detecting circuit 240 generates the indication signal). Thus, the determining circuit 280 generates the threshold according to the indication signal as well as the second and third reference values (step S880). For example, the determining circuit 280 obtains a smaller value between $\alpha$ times the second reference value and $\beta$ times the third reference value as the threshold ($\alpha$, $\beta$>1, where $\alpha$ and $\beta$ may be equal or different).

Figure 9:
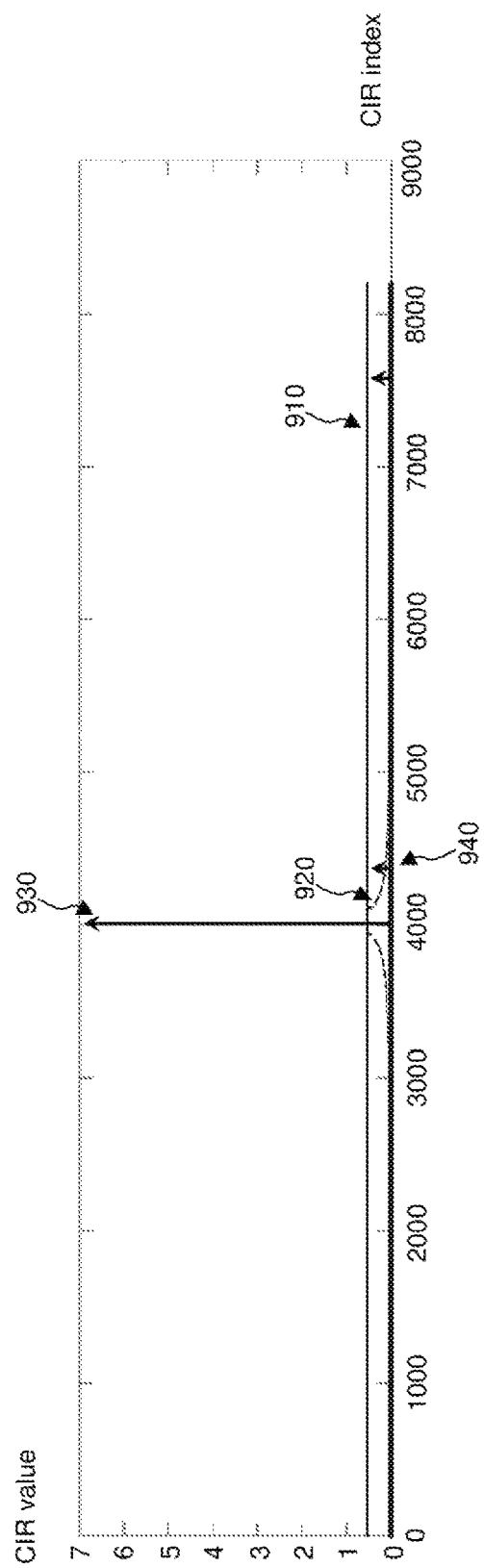
FIG. 9 is a schematic diagram of a relationship between another channel impulse response value and a channel impulse response index.

In the embodiment in FIG. 4, the filtering circuits 220 and 230 are moving average calculating circuits. Thus, when few of the channel impulse response values CIR in the filtering windows are excessively large or when there is an excessively large number of channel impulse response values CIR that are greater than the first reference value in the filtering windows, the outputs of the filtering circuit 220 and the filtering circuit 230 may not become small enough in time as subsequent channel impulse response values get smaller, hence leading to misjudgment. In contrast, in the embodiment in FIG. 7, by using the selecting circuit 260 and the selecting circuit 270, the values to be inputted into the filtering circuit 220 and the filtering circuit 230 are first limited to be smaller than or equal to the first reference value, and so the issues of the embodiment in FIG. 4 can be prevented. For example, FIG. 9 shows a schematic diagram of a relationship between another channel impulse response value and a channel impulse response index. A threshold 910 (the straight segment) is a constant value (e.g., equal to the first threshold), and a threshold 920 (the curved segments at the sides of a channel impulse response value 930) is the smaller between $\alpha$ times the second reference value and $\beta$ times of the third reference value. If filtering is not performed by the selecting circuit 260 and the selecting circuit 270, the threshold 920 may be pulled up by the channel impulse response value 930, which may then cause a channel impulse response value 940 to be less than the threshold 920, such that the system may misjudge that the channel impulse response value 940 does not correspond to an echo path. Further, as seen in FIG. 9, using the threshold 910 in a constant value may also lead to misjudgment (a high threshold may miss the channel impulse response value 940).

Figure 10:
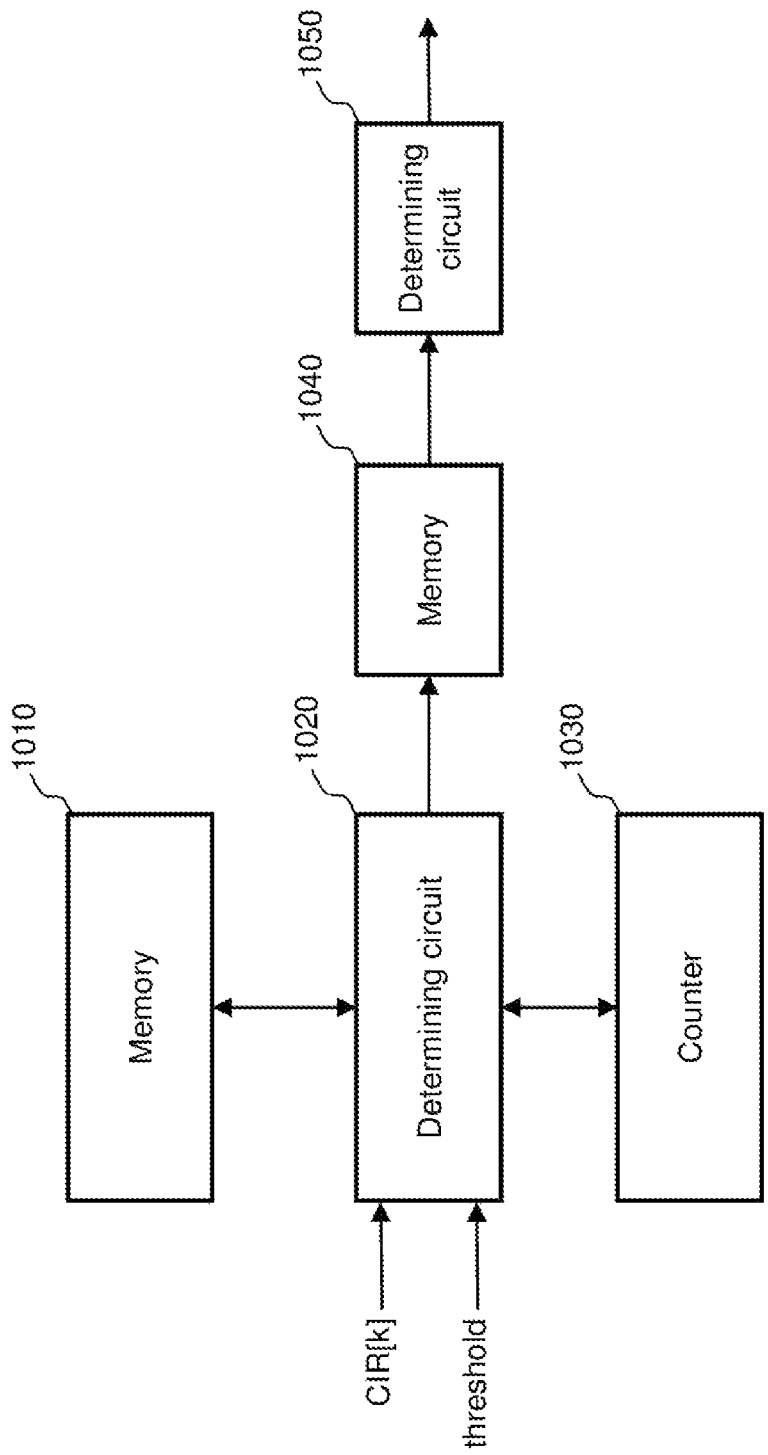
FIG. 10 is a block diagram of an echo determining circuit according to an embodiment of the present invention.
Figure 11:
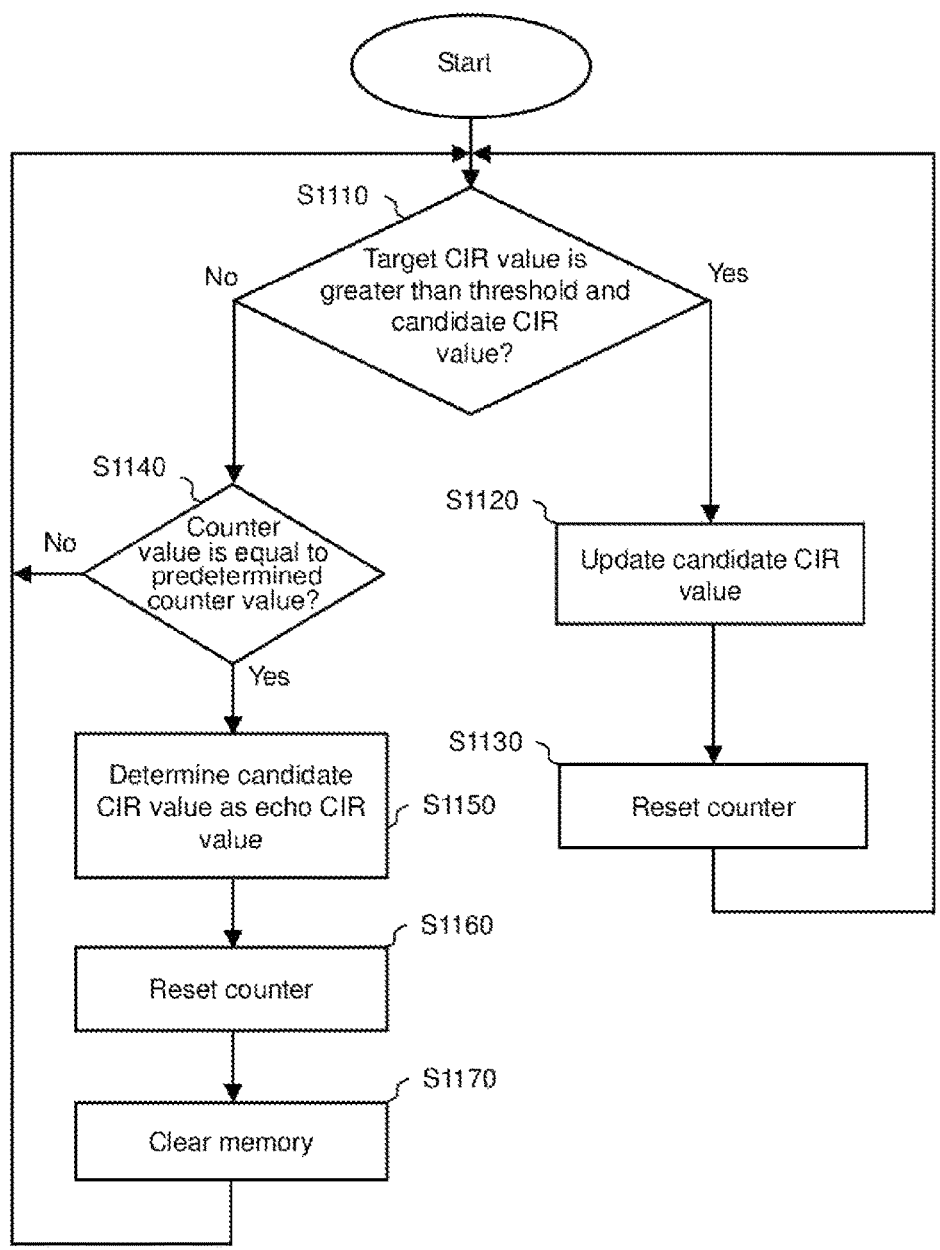
FIG. 11 is a detailed process of step S330 in an echo detection method for a multi-carrier system according to an embodiment of the present invention.

FIG. 10 shows a block diagram of the echo determining circuit 30 according to an embodiment of the present invention. FIG. 11 shows a detailed process of step S330 of the echo detection method for a multi-carrier system according to an embodiment of the present invention. The echo determining circuit 30 includes a memory 1010 (e.g. a register), a determining circuit 1020, a counter 1030, a memory 1040 (e.g. a register) and a determining circuit 1050. The memory 1010 stores a candidate channel impulse response value (having a default value 0) and a corresponding channel impulse response index. The determining circuit 1020 compares the target channel impulse response value CIR[k] with the threshold and the candidate channel impulse response (step S1110). When the target channel impulse response value CIR[k] is greater than the threshold, it means that the target channel impulse response value CIR[k] may correspond to an echo path of the multi-carrier system. When the target channel impulse response value CIR[k] is also greater than the candidate channel impulse response value, the determining circuit 1020 regards the target channel impulse response value CIR[k] as a candidate channel impulse response value at this point, stores the candidate channel impulse response value (CIR[k]) and the corresponding channel impulse response index (k) to the memory 1010 (step S1120), and resets the counter 1030 (step S1130).

Next, the determining circuit 1020 continues comparing the next target channel impulse response value CIR[k+1] with the threshold and the candidate channel impulse response value CIR[k] (iterating step S1110). More specifically, the purpose of the echo determining circuit 30 is comparing the candidate channel impulse response value currently stored in the memory 1010 with M preceding and M subsequent channel impulse response values of the candidate channel impulse response value, where M≥1. When the current candidate channel impulse response value is the largest among the 2 M+1 (i.e., a comparison range of the determining circuit 1020) channel impulse response values, the determining circuit 1020 determines that the candidate channel impulse response is a echo channel impulse response value corresponding to an echo path, and stores the echo channel impulse response value and the corresponding channel impulse response index to the memory 1040. Conversely, the determining circuit 1020 determines that the candidate channel impulse response value does not correspond to an echo path, and determines whether the comparison range ends according to the counter value of the counter 1030.

More specifically, when the determination result of step S1110 is affirmative (it is confirmed at this point that the candidate channel impulse response value is larger than the M preceding channel impulse response values), the determining circuit 1020 controls the counter 1030 to re-count. When the counter 1030 continues counting to M (i.e., step S1110 and step S1140 are iterated until the determination result of step S1140 is affirmative), it means that there are M consecutive channel impulse response values smaller than one of the threshold and the candidate channel impulse response value, and so the counter 1030 generates a control signal to notify the determining circuit 1020. At this point, the determining circuit 1020 confirms that the candidate channel impulse response value is larger than the M subsequent channel impulse response values according to the control signal, and thus determines the candidate channel impulse response value as an echo channel impulse response value (step S1150), resets the counter 1030 (step S1160), and clears the memory 1010 (step S1170).

The above steps are continuously performed. At the end, the memory 1040 stores a plurality of echo channel impulse response values and the corresponding channel impulse response indices, and the determining circuit 1050 may then calculate the number of echo path and a channel length of the multi-carrier system according to the contents stored in the memory 1040.

It should be noted that, the determining circuit 1020 may determine whether the target channel impulse response value CIR[k] is a candidate channel impulse response value and whether the candidate channel impulse response value is an echo channel impulse response value in a parallel or simultaneously manner. That is, instead of having to first identify all of the candidate channel impulse response values and then determine echo channel impulse response values from these candidate channel impulse response values, a plurality of echo channel impulse response values may be determined after the echo determining circuit 30 finishes inspecting all of the N channel impulse response values, thereby enhancing the performance of the circuit.

In conclusion, to determine whether a predetermined channel impulse response is echo, as opposed to adopting a constant threshold as in the prior art, the present invention dynamically determines a threshold with reference to the predetermined channel impulse response and multiple preceding and multiple subsequent channel impulse responses of the predetermined channel impulse response. Further, when calculating the moving average of the multiple preceding and multiple subsequent channel impulse responses by moving average calculating circuits to generate the threshold, the threshold may be pulled up due to excessively large maximum values of certain channel impulse response values. Therefore, in the present invention, the selecting circuit 260 and the selecting circuit 270 are used to select input values of the filtering circuit 220 and the filtering circuit 230 to prevent these maximum values from being considered in the moving average calculation, thereby improving the foregoing drawback.

One person skilled in the art may understand implementation details and variations of the method in FIG. 3, FIG. 5, FIG. 8 and FIG. 11 of the present invention based on the disclosure of the device in FIG. 2, FIG. 4, FIG. 7 and FIG. 10. While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An echo detection circuit for a multi-carrier system, comprising:
    a memory, storing a plurality of channel impulse response values of the multi-carrier system, the channel impulse response values comprising a target channel impulse response, a plurality of preceding channel impulse response values, and a plurality of subsequent channel impulse response values;
    a threshold generating circuit, coupled to the memory, generating a threshold corresponding to the target channel impulse response value according to the preceding channel impulse response values and the subsequent channel impulse response values; and
    an echo determining circuit, coupled to the threshold generating circuit and the memory, comparing the target channel impulse response with the threshold to determine whether the target channel impulse response value corresponds to an echo path of the multi-carrier system,
    wherein the threshold generating circuit comprises:
    a calculating circuit, coupled to the memory, generating a first reference value according to a maximum of the channel impulse response values;
    a first filtering circuit, coupled to the memory, filtering the preceding channel impulse response values to generate a second reference value;
    a second filtering circuit, coupled to the memory, filtering the subsequent channel impulse response values to generate a third reference value; and
    a determining circuit, coupled to the calculating circuit, the first filtering circuit and the second filtering circuit, generating the threshold according to the first reference value, the second reference value and the third reference value.

2. The echo detection circuit according to claim 1, wherein each of the first filtering circuit and the second filtering circuit is a moving average calculating circuit comprising a buffer unit, and the threshold generating circuit further comprises:
    a detecting circuit, coupled to the determining circuit, generating an indication signal indicating whether the first filtering circuit and the second filtering circuit are stable according to a size of the buffer unit;
    wherein, the determining circuit generates the threshold according to the indication signal.

3. The echo detection circuit according to claim 1, wherein the preceding channel impulse response values are N consecutive channel impulse response values before the target channel impulse response value, and the first filtering circuit calculates an average of the preceding channel impulse response values to generate the second reference value, where N is a positive integer.

4. The echo detection circuit according to claim 1, wherein the memory is a first memory, and the echo determining circuit comprises:
a second memory, storing a candidate channel impulse response value; and
a determining circuit, coupled to the threshold generating circuit, the first memory and the second memory, comparing the target channel impulse response value with the threshold and the candidate channel impulse response value, and determining that the target channel impulse response value does not correspond to the echo path of the multi-carrier system when the target channel impulse response value is smaller than one of the threshold and the candidate channel impulse response value.

5. The echo detection circuit according to claim 4, wherein the echo determining circuit further comprises:
a counter, coupled to the determining circuit, counting a consecutive number of times that the target channel impulse response value is smaller than one of the threshold and the candidate channel impulse response value, and generating a control signal when the consecutive number of times reaches to a predetermined value;
wherein, the determining circuit determines that the candidate channel impulse response value corresponds to the echo path of the multi-carrier system according to the control signal.

6. The echo detection circuit according to claim 5, wherein when the target channel impulse response value is greater than the threshold and the candidate channel impulse response value, the determining circuit stores the target channel impulse response into the second memory to replace the candidate channel impulse response value and resets the counter.

7. The echo detection circuit according to claim 5, wherein the determining circuit outputs the candidate channel impulse response value corresponding to the echo path of the multi-carrier system as an echo channel impulse response value, and the echo determining circuit further comprises:
a third memory, coupled to the determining circuit, storing the echo channel impulse response value; and
a determining circuit, coupled to the third memory, calculating a channel length of the multi-carrier system according to contents stored in the third memory.

8. An echo detection method for a multi-carrier system, comprising:
storing a plurality of channel impulse response values of the multi-carrier system, the channel impulse response values comprising a target channel impulse response, a plurality of preceding channel impulse response values, and a plurality of subsequent channel impulse response values;
generating a threshold corresponding to the target channel impulse response value according to the preceding channel impulse response values and the subsequent channel impulse response values; and
comparing the target channel impulse response with the threshold to determine whether the target channel impulse response value corresponds to an echo path of the multi-carrier system, wherein the step of generating the threshold corresponding to the target channel impulse response value according to the preceding channel impulse response values and the subsequent channel impulse response values comprises:
generating a first reference value according to a maximum of the channel impulse response values;
filtering the preceding channel impulse response values to generate a second reference value;
filtering the subsequent channel impulse response values to generate a third reference value; and
generating the threshold according to the first reference value, the second reference value and the third reference value.

9. The echo detection method according to claim 8, wherein the preceding channel impulse response values are N consecutive channel impulse response values before the target channel impulse response value, and the step of filtering the preceding channel impulse response values to generate the second reference value is calculating an average of the preceding channel impulse response values to generate the second reference value, wherein N is a positive integer.

10. The echo detection method according to claim 8, wherein the step of comparing the target channel impulse response with the threshold to determine whether the target channel impulse response value corresponds to the echo path of the multi-carrier system comprises:
storing a candidate channel impulse response value; and
comparing the target channel impulse response value with the threshold and the candidate channel impulse response value;
wherein, when the target channel impulse response value is smaller than one of the threshold and the candidate channel impulse response value, it is determined that the target channel impulse response value does not correspond to the echo path of the multi-carrier system.

11. The echo detection method according to claim 10, wherein the step of comparing the target channel impulse response value with the threshold and the candidate channel impulse response value to determine whether the target channel impulse response value corresponds to the echo path of the multi-carrier system further comprises:
counting a consecutive number of times that the target channel impulse response value is smaller than one of the threshold and the candidate channel impulse response value, and generating a control signal when counting to the consecutive number of times reaches a predetermined value;
wherein, the step of comparing the target channel impulse response value with the threshold and the candidate channel impulse response is determining that the candidate channel impulse response value corresponds to the echo path of the multi-carrier system according to the control signal.

12. The echo detection method according to claim 11, wherein the step of comparing the target channel impulse response value with the threshold and the candidate channel impulse response is storing the target channel impulse response value to replace the candidate channel impulse response value and resetting the consecutive number of times when the target channel impulse response value is greater than the threshold and the candidate channel impulse response value.

13. The echo detection method according to claim 11, wherein the step of comparing the target channel impulse response value with the threshold and the candidate channel impulse response is outputting the candidate channel impulse response value corresponding to the echo path of the multi-carrier system as an echo channel impulse response value, and the step of comparing the target channel impulse response value with the threshold to determine whether the target channel impulse response corresponds to the echo path of the multi-carrier system further comprises:
   storing the echo channel impulse response value; and
   calculating a channel length of the multi-carrier system according to the echo channel impulse response value.

14. An echo detection circuit for a multi-carrier system, comprising:
   a memory, storing a plurality of channel impulse response values of the multi-carrier system, the channel impulse response values comprising a target channel impulse response, a plurality of preceding channel impulse response values, and a plurality of subsequent channel impulse response values;
   a threshold generating circuit, coupled to the memory, generating a threshold corresponding to the target channel impulse response value according to the preceding channel impulse response values and the subsequent channel impulse response values; and
   an echo determining circuit, coupled to the threshold generating circuit and the memory, comparing the target channel impulse response with the threshold to determine whether the target channel impulse response value corresponds to an echo path of the multi-carrier system,
   wherein the threshold generating circuit comprises:
   a calculating circuit, coupled to the memory, generating a first reference value according to a maximum of the channel impulse response values;
   a first selecting circuit, coupled to the memory and the calculating circuit, individually comparing the preceding channel impulse response values with the first reference value to select a plurality of first median values, wherein each of the first median values is a smaller between the respective preceding channel impulse response values and the first reference value;
   a first filtering circuit, coupled to the first selecting circuit, filtering the first median values to generate a second reference value;
   a second selecting circuit, coupled to the memory and the calculating circuit, individually comparing the subsequent channel impulse response values with the first reference value to select a plurality of second median values, wherein each of the second median values is a smaller between the respectively subsequent channel impulse response values and the first reference value;
   a second filtering circuit, coupled to the second selecting circuit, filtering the second median values to generate a third reference value; and
   a determining circuit, coupled to the first filtering circuit and the second filtering circuit, generating the threshold according to the second reference value and the third reference value.

15. The echo detection circuit according to claim 14, wherein each of the first of the first filtering circuit and the second filtering circuit is a moving average calculating circuit comprising a buffer unit, and the threshold generating circuit further comprises:
   a detecting circuit, coupled to the determining circuit, generating an indication signal indicating whether the first filtering circuit and the second filtering circuit are stable according to a size of the buffer unit;
   wherein, the determining circuit generates the threshold according to the indication signal.

16. The echo detection circuit according to claim 14, wherein the preceding channel impulse response values are N consecutive channel impulse response values before the target channel impulse response value, and the first filtering circuit calculates an average of the preceding channel impulse response values to generate the second reference value, where N is a positive integer.

17. An echo detection method for a multi-carrier system, comprising:
   storing a plurality of channel impulse response values of the multi-carrier system, the channel impulse response values comprising a target channel impulse response, a plurality of preceding channel impulse response values, and a plurality of subsequent channel impulse response values;
   generating a threshold corresponding to the target channel impulse response value according to the preceding channel impulse response values and the subsequent channel impulse response values; and
   comparing the target channel impulse response with the threshold to determine whether the target channel impulse response value corresponds to an echo path of the multi-carrier system,
   wherein the step of generating the threshold corresponding to the target channel impulse response value according to the preceding channel impulse response values and the subsequent channel impulse response values comprises:
   generating a first reference value according to a maximum of the channel impulse response values;
   comparing the preceding channel impulse response values with the first reference value to select a plurality of first median values, wherein each of the first median values is a smaller between the respective preceding channel impulse response values and the first reference value;
   filtering the first median values to generate a second reference value;
   comparing the subsequent channel impulse response values with the first reference value to select a plurality of second median values, wherein each of the second median values is a smaller between the respective subsequent channel impulse response values and the first reference value;
   filtering the second median values to generate a third reference value; and
   generating the threshold according to the second reference value and the third reference value.

18. The echo detection method according to claim 17, wherein the preceding channel impulse response values are N consecutive channel impulse response values before the target channel impulse response value, and the step of filtering the first median values to generate the second reference value is calculating an average of the first median values, where N is a positive integer.

* * * * *